United States Patent

Shepherd et al.

[11] Patent Number: 5,863,091
[45] Date of Patent: Jan. 26, 1999

[54] VEHICLE FLOOR ASSEMBLY

[75] Inventors: Earl H. Shepherd, Issaquah, Wash.; John W. Cahill, Hudson, Ohio

[73] Assignee: National Shelter Products, Inc., Issaquah, Wash.

[21] Appl. No.: 907,176

[22] Filed: Aug. 6, 1997

[51] Int. Cl.⁶ .................................................. B60J 5/06
[52] U.S. Cl. ........................................ 296/181; 296/191
[58] Field of Search .................................. 296/181, 182, 296/191, 39.1, 39.3

[56] References Cited

U.S. PATENT DOCUMENTS

| | | | |
|---|---|---|---|
| 4,105,820 | 8/1978 | Antoni | 428/213 |
| 4,610,915 | 9/1986 | Crenshaw et al. | 428/219 |
| 4,930,809 | 6/1990 | Lindsay | 280/789 |
| 5,509,715 | 4/1996 | Scharpf | 296/181 |
| 5,518,799 | 5/1996 | Finestone et al. | 428/137 |
| 5,620,694 | 4/1997 | Girardot | 424/402 |

*Primary Examiner*—Joseph D. Pape
*Attorney, Agent, or Firm*—Flynn, Thiel, Boutell & Tanis, P.C.

[57] ABSTRACT

A vehicle floor assembly is made up of a floor and a liner provided underneath and attached to the floor. The liner is made up of a cellulosic or unwoven polymer fabric bonding layer laminated to a polymer fabric reinforcing layer. The polymer fabric of the reinforcing layer can either be woven or unwoven. This vehicle floor assembly has an improved moisture resistance and strength over conventional floor assemblies.

26 Claims, 1 Drawing Sheet

VEHICLE FLOOR ASSEMBLY

FIELD OF THE INVENTION

This invention relates to a vehicle floor assembly which exhibits an unexpectedly high moisture resistance, resistance to stretching, lamination bond strength and stiffness and is especially suitable for use in recreational vehicles and trailers.

BACKGROUND OF THE INVENTION

Mobile vehicles such as cars, trucks, vans, recreational vehicles and trailers have become increasingly popular in today's mobile society. As a result of the more extensive use of these vehicles, maintenance problems resulting from the increased exposure of the vehicle's undersiding to corrosive environmental and road conditions have become more of a problem. Of particular concern are the floor assemblies of these vehicles where moisture, dirt and other contaminants from the road surface work their way up through the vehicle floor to cause warping, corrosion or other damage to the vehicle floor.

In view of these problems, several solutions have been proposed for protecting the vehicle floor from road conditions. U.S. Pat. No. 4,930,809 discloses a towable unified floor frame assembly in which a moisture, dirt, insect and pest excluding thin cover is provided underneath the floor frame assembly. This thin covering can be thin plywood, asphalted paper or the like, with or without a net-like reinforcement included therein.

U.S. Pat. No. 5,054,843 discloses a bonded composite insulated floor made up of a deck, supporting plastic beams which are mounted on an underpan, and metal crossing beams which support the underpan. The regions between the deck, plastic beams and underpan are filled with foamed plastic which provides insulation and adhesively and mechanically bond this assembly together.

U.S. Pat. No. 5,456,513 discloses a sound, water and dust barrier for a vehicle which is made up of a central thermoplastic layer covered by thin outer thermoplastic layers.

Although the above discussed patents do present solutions to the problem of protecting a vehicle floor assembly, they also have problems in that the protective structure is expensive, heavy and difficult to install or does not provide adequate protection over a sustained period of use. The present invention was arrived at in order to overcome these problems.

SUMMARY OF THE INVENTION

It is an object of the present invention to provide a vehicle floor assembly which is lightweight, inexpensive and affords maximum protection from environmental contamination.

It is a further object of the present invention to provide a vehicle floor assembly which can be easily installed and yet is lightweight, inexpensive and affords maximum protection against environmental contamination.

These and other objects of the present invention are accomplished by providing a vehicle floor assembly made up of a floor and a liner provided underneath and laminated to the floor, wherein the liner comprises a polymer fabric reinforcing layer laminated to a bonding layer.

DETAILED DESCRIPTION

Figure 1:
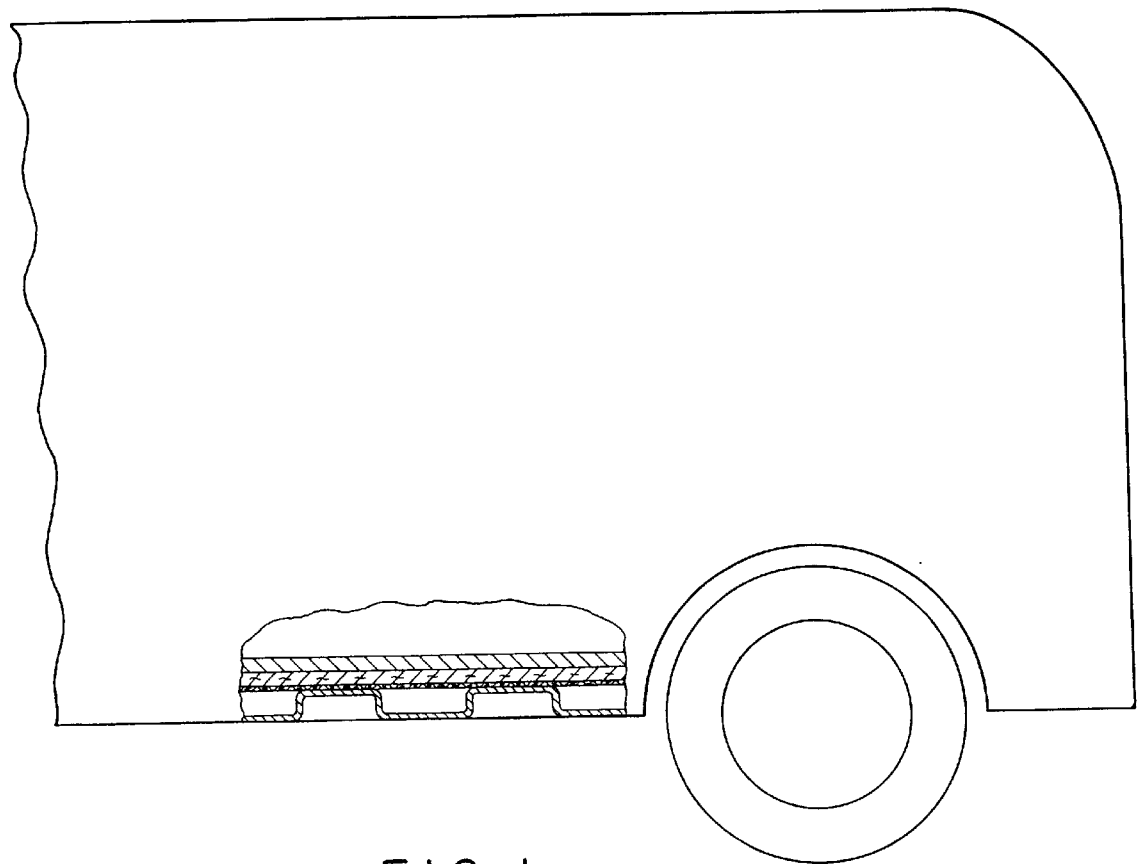
FIG. 1 is a cut away side view of a vehicle body illustrating the floor assembly of the present invention.

FIG. 1 generally illustrates a rear end of a vehicle body 10 having a floor assembly 11 made up of a floor 12 and a protective liner 16 provided underneath and attached to the floor 12 and which is made up of a bonding layer 17 and a polymer fabric reinforcing layer 20. A floor frame 15 is optionally provided to support the liner 16 and the floor 12.

The material of construction of the floor 12 is not critical and can be wood, a metal, a thermoplastic or any other material which is suitable for the particular vehicle in which it is installed.

The bonding layer 17 is adhered directly to the floor 12 and can be made of an unwoven polymeric fabric or a cellulosic material. As the material of the unwoven polymer fabric, a thermoplastic polymer is used, with a polyolefin such as a polyethylene and a polypropylene and a polyester being particularly preferred.

The cellulosic or unwoven polymer fabric layer 17 generally has a thickness of from about 0.001 to 0.25 inches, preferably about 0.05 inches. Although different types of cellulosic materials are suitable for use in the present invention as the cellulose layer 17, Kraft paper and fiberboard are especially preferable, with Kraft paper being particularly preferred.

In order to improve the moisture resistance and mechanical strength of the cellulosic layer 17, it optionally may be impregnated with an adhesive and/or a resin. As the adhesive or resin, a urethane, polyester, phenolic, epoxy, phenol-aralkyl and resorcinol resin can be used but the present invention is not limited thereto. Additionally, other additives such as plasticizers, flame retardants, lubricants and mineral fillers can be incorporated into the resin or adhesive in order to modify its properties.

The cellulosic layer 17 can be impregnated with the adhesive and/or resin to the extent that it is from about 3% to 100% saturated. If impregnated, preferably, the cellulosic layer 17 has a degree of impregnation of from about 25% to about 50%, with about 35% being particularly preferred.

The manner of application of the resin or adhesive to the cellulosic layer 17 is not critical as long as it results in the layer being impregnated. The resin or adhesive may be applied to the cellulosic layer 17 by coating the resin and/or adhesive onto the layer using end-line rolls. Additionally, the cellulosic layer 17 can be pulled through a bath of a resin and/or adhesive or the resin and/or adhesive can be sprayed onto the surface of the cellulosic layer 17. The resin and/or adhesive can also be applied to the cellulosic layer 17 by applying beads of the resin and/or adhesive material onto the cellulosic layer and letting it absorb therein. The temperature at which the resin and/or adhesive is applied to the cellulosic layer 17 is not critical and can be room temperature or any temperature readily determined by one of ordinary skill in the art to optimize the absorption of the resin and/or adhesive material into the cellulosic layer 17.

Once the cellulosic layer 17 is impregnated with the resin and/or adhesive, a reinforcing layer 20 of a polymeric fabric is applied thereto. The polymeric fabric can be woven or unwoven and is preferably a thermoplastic material such as a polyester or a polyolefin. As the polyolefin, polyethylene and polypropylene are particularly preferred, with polypropylene being the most preferred material.

After the cellulosic layer 17 has been impregnated, the polymer fabric layer 20 is applied thereto and the resultant laminate 16 is subjected to pressure for a period of time necessary to adequately secure the polymer fabric layer 20 to the cellulosic layer 17. The laminate is then allowed to cure and form the protective liner 16 of the present invention.

If the cellulosic layer 17 is not impregnated with the resin and/or adhesive, the cellulosic or the unwoven polymer fabric layer 17 can be laminated to the polymer fabric reinforcing layer 20 by applying an adhesive to the surface of the bonding layer 17 and/or the polymer fabric reinforcing layer 20 and applying the layers to each other to form a laminate 16. The laminate 16 is then subjected to pressure for a period of time necessary to adequately secure the layers to each other and the laminate 16 is then allowed to cure.

Figure 2:
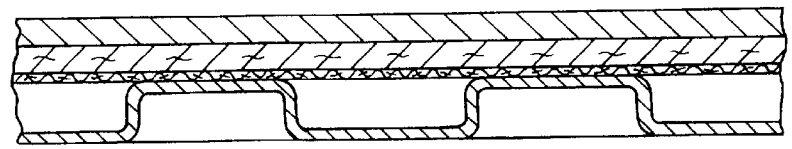
FIG. 2 is a sectional side view of the floor assembly of the present invention.

As shown in FIG. 2, the protective liner 16 of the present invention is provided directly underneath the vehicle floor 12 with the bonding layer 17 contacting the vehicle floor 12. The liner 16 is installed underneath the floor 12 during the assembly of the vehicle and can be secured in place by any suitable means such as tacking or being bolted in place.

Although a metal pan floor support frame 15 is illustrated in FIG. 2, other types of support frames such as perimeter-type frames where the liner 16 is only supported at the periphery thereof may also be used. Alternatively, the frame 15 can be omitted and the liner 16 supported only by its attachment to the floor 12.

The vehicle floor assembly 11 of the present invention is highly resistant to environmental contaminants, inexpensive, easy to fabricate and is of a lightweight construction. It can be provided in different sizes and configurations depending on the desired end use. The thickness of the bonding layer 17 and the polymer fabric reinforcing layer 20 are readily determinable by one of ordinary skill in the art depending on the type of vehicle in which the liner 16 is installed and the road environment to which the liner 16 is exposed.

Although a particularly preferred embodiment of the present invention has been disclosed in detail for illustrative purposes, it will be recognized that variations or modifications of the disclosed invention, including the use of equivalent components, lie within the scope of the present invention.

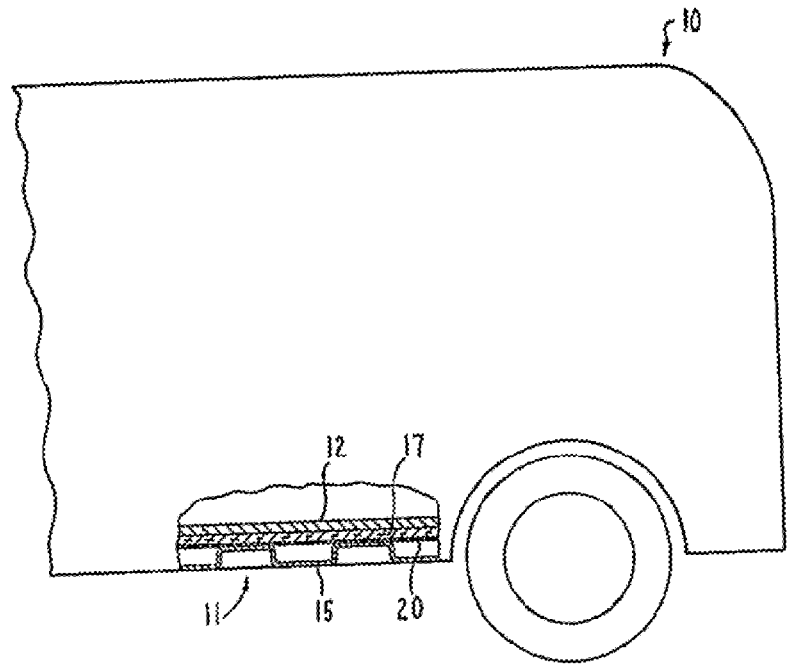

We claim:

1. In a vehicle floor assembly comprising a floor, a floor support frame and a liner provided underneath and attached to the floor, the improvement comprising said liner having a polymer fabric reinforcing layer laminated to a cellulosic or unwoven polymer fabric bonding layer which is bonded directly to the floor.

2. The assembly of claim 1, wherein the polymer fabric of the reinforcing layer is woven.

3. The assembly of claim 1, wherein the polymer fabric of the reinforcing layer is unwoven.

4. The assembly of claim 1, wherein the bonding layer is made of a cellulosic material.

5. The assembly of claim 1, wherein the bonding layer is made of an unwoven polymer fabric.

6. The assembly of claim 4, wherein the cellulosic material is a paper.

7. The assembly of claim 6, wherein the paper is a Kraft paper.

8. The assembly of claim 4, wherein the cellulosic material is a fiberboard.

9. The assembly of claim 5, wherein the polymer of the bonding layer is thermoplastic.

10. The assembly of claim 9, wherein the polymer is a polyolefin.

11. The assembly of claim 9, wherein the polymer is a polyester.

12. The assembly of claim 1, wherein the polymer of the reinforcing layer is thermoplastic.

13. The assembly of claim 12, wherein the polymer is a polyolefin.

14. The assembly of claim 12, wherein the polymer is a polyester.

15. The assembly of claim 4, wherein the cellulosic layer is impregnated with a member selected from the group consisting of a resin, an adhesive and mixtures thereof.

16. The assembly of claim 10, wherein the polyolefin is selected from the group consisting of polyethylene and polypropylene.

17. The assembly of claim 13, wherein the polyolefin is selected from the group consisting of polyethylene and polypropylene.

18. The assembly of claim 15, wherein the cellulosic layer is impregnated with a urethane.

19. The assembly of claim 15, wherein the cellulosic layer is impregnated with a polyester.

20. The assembly of claim 15, wherein the cellulosic layer is impregnated with a polyurethane and a polyester.

21. The assembly of claim 15, wherein the cellulosic layer is impregnated to a degree of saturation of from about 3% to 100%.

22. The assembly of claim 21, wherein the cellulosic layer is impregnated to a degree of saturation of from about 25% to 50%.

23. The assembly of claim 22, wherein the cellulosic layer is impregnated to a degree of saturation of about 35%.

24. The assembly of claim 1, wherein the vehicle is a motor vehicle.

25. The assembly of claim 1, wherein the vehicle is a recreational vehicle.

26. The assembly of claim 1, wherein the vehicle is a trailer.

* * * * *

UNITED STATES PATENT AND TRADEMARK OFFICE
CERTIFICATE OF CORRECTION

| | | |
|---|---|---|
| PATENT NO. | : 5,863,091 | |
| APPLICATION NO. | : 08/907176 | |
| DATED | : January 26, 1999 | |
| INVENTOR(S) | : Earl H. Shepherd et al. | |

It is certified that error appears in the above-identified patent and that said Letters Patent is hereby corrected as shown below:

The title page should be deleted to appear as per attached title page.

The sheet of drawing consisting of figure 1-2 should be deleted to appear as per figures 1-2 as shown below:

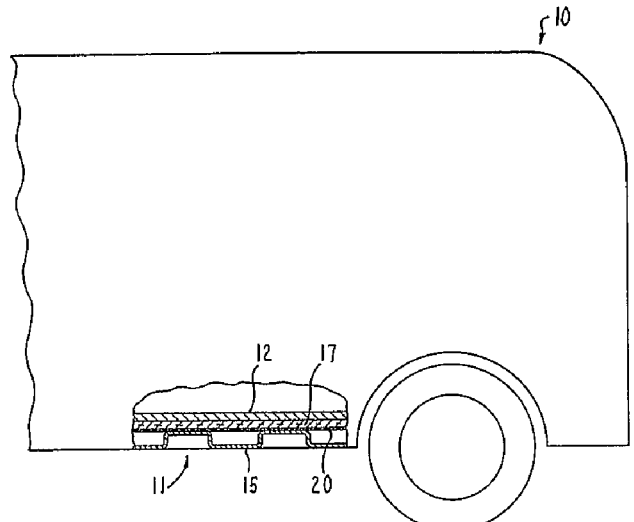

FIG. 1

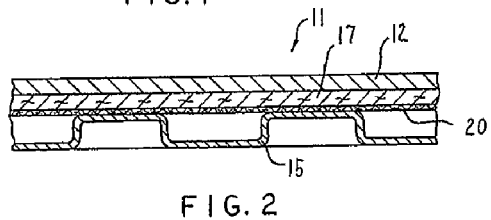

FIG. 2

Signed and Sealed this

Fourth Day of September, 2007

JON W. DUDAS
*Director of the United States Patent and Trademark Office*

United States Patent [19]
Shepherd et al.

[11] Patent Number: 5,863,091
[45] Date of Patent: Jan. 26, 1999

[54] VEHICLE FLOOR ASSEMBLY

[75] Inventors: Earl H. Shepherd, Issaquah, Wash.; John W. Cahill, Hudson, Ohio

[73] Assignee: National Shelter Products, Inc., Issaquah, Wash.

[21] Appl. No.: 907,176

[22] Filed: Aug. 6, 1997

[51] Int. Cl.⁶ .................................................. B60J 5/06
[52] U.S. Cl. ................................... 296/181; 296/191
[58] Field of Search ........................... 296/181, 182, 296/191, 39.1, 39.3

[56] References Cited

U.S. PATENT DOCUMENTS

| | | | |
|---|---|---|---|
| 4,105,820 | 8/1978 | Antoni | 428/213 |
| 4,610,915 | 9/1986 | Crenshaw et al. | 428/219 |
| 4,930,809 | 6/1990 | Lindsay | 280/789 |
| 5,509,715 | 4/1996 | Scharpf | 296/181 |
| 5,518,799 | 5/1996 | Finestone et al. | 428/137 |
| 5,620,694 | 4/1997 | Girardot | 424/402 |

*Primary Examiner*—Joseph D. Pape
*Attorney, Agent, or Firm*—Flynn, Thiel, Boutell & Tanis, P.C.

[57] ABSTRACT

A vehicle floor assembly is made up of a floor and a liner provided underneath and attached to the floor. The liner is made up of a cellulosic or unwoven polymer fabric bonding layer laminated to a polymer fabric reinforcing layer. The polymer fabric of the reinforcing layer can either be woven or unwoven. This vehicle floor assembly has an improved moisture resistance and strength over conventional floor assemblies.

26 Claims, 1 Drawing Sheet